United States Patent [19]

Roloff et al.

[11] Patent Number: 4,588,975

[45] Date of Patent: May 13, 1986

[54] INTEGRATED SENSOR FOR FORCE AND MOTION

[75] Inventors: Herbert F. Roloff; Hartwig W. Köllner, both of Munich, Fed. Rep. of Germany

[73] Assignee: Siemens Aktiengesellschaft, Berlin and Munich, Fed. Rep. of Germany

[21] Appl. No.: 510,082

[22] Filed: Jun. 30, 1983

[30] Foreign Application Priority Data

Jul. 2, 1982 [DE] Fed. Rep. of Germany ....... 3224792

[51] Int. Cl.$^4$ .......................... G01L 1/22; G01L 1/18
[52] U.S. Cl. ............................................ 338/5; 338/2; 338/47; 73/862.65
[58] Field of Search .............................. 338/5, 2, 47; 73/862.65, 781, 775, 776, 777

[56] References Cited

U.S. PATENT DOCUMENTS

| | | | |
|---|---|---|---|
| 3,599,139 | 8/1971 | Low | 338/2 |
| 3,986,254 | 10/1976 | Nordstrom | 338/2 X |
| 4,319,397 | 3/1982 | Tanabe et al. | 338/2 X |
| 4,423,640 | 1/1984 | Jetter | 338/5 X |

FOREIGN PATENT DOCUMENTS

| | | | |
|---|---|---|---|
| 2532956 | 2/1981 | Fed. Rep. of Germany . | |
| 56-124030 | 9/1981 | Japan | 338/2 |

Primary Examiner—C. L. Albritton
Assistant Examiner—M. M. Lateef
Attorney, Agent, or Firm—Herbert L. Lerner; Laurence A. Greenberg

[57] ABSTRACT

An integrated sensor for force and motion, includes a solid insulating material body, a flexible metal strip for force transmission sealed to and extending out of the body, a piezoresistive probe in the form of a silicon wafer fastened on the metal strip in the body for mechanical loading by the metal strip, conductive connections sealed to and extending out of the body for application to an electrical instrument and for voltage supply to the probe, and at least two electrical terminals connected between the silicon wafer and the conductive connections.

7 Claims, 2 Drawing Figures

INTEGRATED SENSOR FOR FORCE AND MOTION

BACKGROUND OF THE INVENTION

1. Field of the Invention

The invention relates to an integrated sensor for force or load and motion or displacement, including a silicon wafer in the form of a piezoresistive probe, which is provided for mechanical loading and is provided with at least two electrical terminals for voltage supply to the piezoresistive probe by being applied to an electrical instrument.

2. Description of the Prior Art

A piezoresistive probe of such type is described in German Published, Non-Prosecuted Application DE-OS No. 29 32 956. The probe may be used for a series of functions with success. It is attempted for reasons of reliability in the case of certain applications, such as for suction pressure control in vacuum cleaners or for speed control of sewing machines and other household appliances and for speed control of drilling machines, to replace the potentiometer used in the usual manner for the adjustment of operating conditions through current supply of the device through a semiconductor element in a sealed region or body having the function of transforming the motion of a membrane or of a lever or the like, to an electrical signal proportional thereto. During application of such a semiconductor element forming a piezoresistive probe, the disadvantage of the susceptibility of the potentiometer to dust and fiber particles, which results from operation of the device to be controlled, is removed since the semiconductor probe is disposed in a sealed covering or body.

Therefore, on the other hand, care must be taken to ensure that a good force transmission to the semiconductor body of the probe is guaranteed, even though the probe is completely sealed in a covering or a body, against the electrical device to be loaded by the probe, such as a vacuum cleaner, etc. In addition, the covering itself should be constructed in such a way that changes in temperature due to the covering, in the working scope provided for the probe, cannot exert considerable faulty influences on the working function of the probe. Finally, a stable mounting of the probe in its covering or body, considering the problem to be solved by the probe, is of considerable importance.

SUMMARY OF THE INVENTION

It is accordingly an object of the invention to provide an integrated sensor for force and motion, which overcomes the hereinafore-mentioned disadvantages of the heretofore-known devices of this general type, and to do so to a high degree at low costs.

With the foregoing and other objects in view there is provided, in accordance with the invention, an integrated sensor for force and motion, comprising a solid insulating material body, a flexible metal strip for force or power transfer or transmission embedded in or sealed to and extending out of the body, a piezoresistive probe in the form of a silicon wafer fastened on the metal strip in the body for mechanical loading or stress by the metal strip, conductive connections embedded in or sealed to and extending out of the body for application to an electrical instrument and for voltage supply to the probe, and at least two electrical terminals connected between the silicon wafer and the conductive connections.

In accordance with another feature of the invention, the body includes a relatively thinner region accomodating the silicon wafer and the metal strip, and a relatively thicker region forming a mounting and fastening device for the sensor and accomodating the conductive connections.

In accordance with a further feature of the invention, the body is formed of electrically insulated organic plastic material.

In accordance with an added feature of the invention, the mounting and fastening device is connectible to an instrument to be controlled by the sensor.

In accordance with an additional feature of the invention, the thinner part of the body is symmetrical to the silicon wafer of the probe and the metal strip.

In accordance with again another feature of the invention, the metal strip is formed of an iron-nickel alloy or an iron-copper alloy.

In accordance with a concomitant feature of the invention, the body is formed of molded plastic or a poured compound.

Other features which are considered as characteristic for the invention are set forth in the appended claims.

Although the invention is illustrated and described herein as embodied in an integrated sensor for force and motion, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
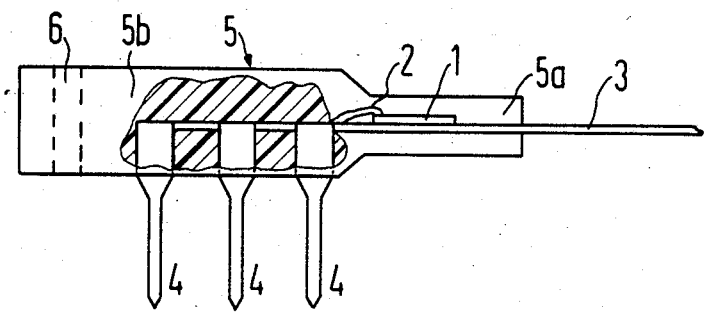
FIG. 1 is a cross-sectional view of the finished device according to the invention.

Referring now to the figures of the drawing in detail, and first particularly to FIG. 1 thereof, there is seen an advantageous development of the invention, having an insulating material casing or covering 5 which accomodates the probe, and is formed of two regions 5a and 5b. A silicon wafer 1 forming the piezoresistive probe itself is found in the thinner region 5a, from which a metal strip 3, carrying the probe 1, projects in the form of a pointer or tongue. The individual terminals 2 of the silicon wafer 1 are each respectively connected by means of a thin wire or filament to an external terminal or conductive connection 4 extending outwardly in a sealed manner.

The external terminals 4 serve for supplying the piezoresistive probe 1 with the electrical supply voltage required for operation. In addition, the connection to the device to be controlled by the piezoresistive probe is introduced through such terminals 4. For example, the device may be an ammeter or voltmeter or an electronic machine to be controlled or regulated.

The subdivision of the compact plastic embedding or insulating material body 5 into a thinner region 5a extending parallel to the metal tongue 3 and a thicker region 5b directly attached to the region 5a, essentially has the advantage that the mounting of the entire apparatus assures that the mounting leads to an exclusively limited mechanical contact of the entire apparatus on the thicker region 5b with a holding part, and therefore no additional mechanical loading of the silicon wafer 1 and, therefore, of the piezoresistive probe, occurs. In addition, the mounting has the advantage that the region 5a directly surrounding the metal tongue 3 and the silicon wafer, compared to the region 5b, guarantees a far stronger influence on the silicon wafer 1, in the case of a mechanical manipulation of the tongue 3 through outside forces to be measured or evaluated, through the mechanical control transmitted through the metal tongue 3, than would be the case if both regions 5a and 5b were equal to each other with respect to their cross section.

For this reason, as well as in the intetest of additional improvement of the overload capacity of the apparatus, it is recommended that the metal tongue 3, at least to the extent that it is found in the region 5a of the plastic embedding 5, be formed as an equally thin metal strip. The silicon wafer 1 of the piezoresistive probe is then fastened through adhesive, soldering, or alloying on the metal strip 3.

Through the choice of the material for the metal strip 3 and thereby its elasticity or flexibility and hardness, as well as through the type of fastening of the silicon wafer on the tongue-like metal strip 3, and finally through the choice of the material for the insulating material for the insulating material embedding 5, the acoustic sensibility of the sensor apparatus, and therefore the possible applications thereof, can be varied, as easily understood. Because of the fabrication technique and the matching of the thermal coefficients of expansion to the silicon crystal 1 on one hand, and to the insulating material embedding 5 on the other hand, a quantity of the Fe-Ni alloy Vacodil, or one of the similar iron-nickel alloys or a copper-iron alloy, respectively, is especially suitable. The thickness of the strip forming the metal tongue 3 is preferably adjusted to 0.1 to 1 mm, and specifically to 0.2 to 0.3 mm.

All plastic materials are suitable for the insulating material embedding 5, such as commercially available molded plastics or sealing compounds, since they are also usually used for the embedding of the semiconductor devices, such as monolithically integrated circuits. Since the action of force is to be transferred onto the silicon wafer 1 of the piezoresistive probe and a transverse loading of the metal tongue 3 accordingly occurs by means of the region 5a of the plastic embedding 5, in every case the thickness of the metal strip forming the tongue 3 and the thickness of the region 5a of the plastic material embedding 5 relative to each other are determined with this in mind. The thickness of the silicon wafer 1 must therefore also be considered. A corresponding example with numerical data is therefore given at the end of this specification.

The thicker part 5b of the plastic covering 5 serves, as already mentioned, for fastening the entire apparatus to a base. This may be part of a device to be controlled through the piezoresistive probe. Therefore, the thicker part 5b can be provided with a bore or perforation 6, specifically for the accomodation of a fastening screw. In addition, the outer terminals 4 are disposed at the thicker part 5b of the plastic embedding 5, as is obvious from FIGS. 1 and 2.

Figure 2:
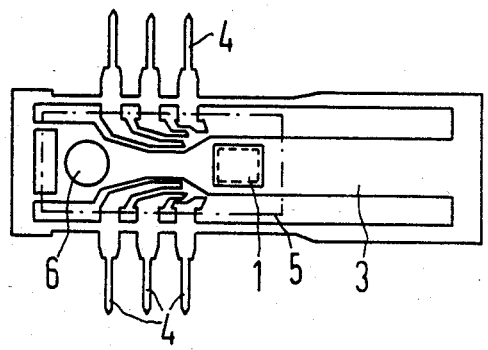
FIG. 2 is a top plan view showing the finished state of the device before applying the plastic embedding.

Therefore, a metal side plate or bar is provided, as shown in the plan view of FIG. 2, as it usually is for mounting and contacting of integrated semiconductor circuits. However, as shown in FIG. 2, differences in the geometric relationship are present as compared to the usual development. The middle part of the side plate or bar is represented by the metal strip forming the metal tongue 3, on which the silicon wafer 1 of the probe is fastened. The silicon wafer 1 forming the probe, is formed in particular in such a way as to correspond to the disclosure of German Published, Non-Prosecuted Application DE-OS No. 29 32 956.

The metal strip 3 is extended in the thicker part 5b of the plastic material covering 5 and surrounds the bore 6, as is obvious from FIG. 2. Aside from the strip 3, pins are disposed on both sides of the external terminals 4. The pins are surrounded by the thicker region 5b of the plastic material covering 5, with the exception of the ends thereof which serve as the external terminal of the apparatus. The connection wires between the electrical terminals of the silicon wafer 1 which lead to the individual pins 4, are not shown in FIG. 2. These wires are fastened in the usual manner at the thicker part of the respective pin 4 which is then covered by the plastic embedding 5. With the exception of the pins 4 and the metal strip 3, all metal parts, which are found outside of the covering, are removed in the usual manner after applying the plastic material embedding.

The application of the plastic material embedding 5 preferably takes place through casting or pressing around and corresponds particularly to usual measures for mounting integrated semiconductor chips.

EXAMPLE

Thickness of the metal strip: 0.25 mm
Thickness of the silicon wafer: 0.2 mm
Thickness of the thinner region of the plastic embedding: 1.5–2 mm
Width of the metal tongue: 2–5 mm
Width of the silicon wafer placed on the center: 1–3 mm
Thickness of the thicker region of the plastic material embedding including the embedding fastened around its metal parts 3 and 4, for example: 3–4 mm It is understandable that other developments of the sensor for force and motion are also possible within the scope of the invention. The development described according to the two figures, however, has proven itself to a special degree.

The foregoing is a description corresponding in substance to German Application P No. 32 24 792.3, dated July 2, 1982, the International priority of which is being claimed for the instant application, and which is hereby made part of this application. Any material discrepancies between the foregoing specification and the aforementioned corresponding German application are to be resolved in favor of the latter.

We claim:

1. Integrated sensor for force and motion, comprising a solid insulating material body, a flexible metal strip formed of an iron-copper alloy for force transmission sealed to and extending out of said body, a piezoresistive probe in the form of a silicon wafer fastened on said metal strip in said body for mechanical loading by said metal strip, conductive connections sealed to and extending out of said body for application to an electrical instrument and for voltage supply to said probe, and at least two electrical terminals connected between said silicon wafer and said conductive connections.

2. Sensor according to claim 1, wherein said body includes a relatively thinner region accomodating said silicon wafer and said metal strip, and a relatively thicker region forming a mounting and fastening device for the sensor and accomodating said conductive connections.

3. Sensor according to claim 2, wherein said body is formed of plastic material.

4. Sensor according to claim 1, wherein said mounting and fastening device is connectible to an instrument to be controlled by the sensor.

5. Sensor according to claim 2, wherein said thinner part of said body is symmetrical to said silicon wafer of said probe and said metal strip.

6. Sensor according to claim 1, wherein said body is formed of molded plastic.

7. Sensor according to claim 1, wherein said body is formed of a poured compound.

* * * * *